(12) United States Patent
Horley

(10) Patent No.: US 6,883,970 B2
(45) Date of Patent: Apr. 26, 2005

(54) THRUST BEARING

(75) Inventor: Wayne Horley, Ardrossan (CA)

(73) Assignee: 598992 Saskatchewan Ltd., Saskatoon (CA)

( * ) Notice: Subject to any disclaimer, the term of this patent is extended or adjusted under 35 U.S.C. 154(b) by 0 days.

(21) Appl. No.: 10/424,353

(22) Filed: Apr. 24, 2003

(65) Prior Publication Data

US 2003/0198423 A1 Oct. 23, 2003

Related U.S. Application Data

(63) Continuation of application No. 09/741,773, filed on Dec. 15, 2000, now abandoned.

(30) Foreign Application Priority Data

Dec. 16, 1999 (CA) ................................................ 2292286

(51) Int. Cl.⁷ .............................................. F16C 33/46
(52) U.S. Cl. ...................................................... 384/623
(58) Field of Search ................................ 384/623, 621, 384/615, 526

(56) References Cited

U.S. PATENT DOCUMENTS

| | | |
|---|---|---|
| 2,218,985 A | 10/1940 | Gibbons |
| 3,586,405 A | 6/1971 | Claesson |
| 3,644,007 A | 2/1972 | Alling |
| 3,876,267 A | 4/1975 | Schaeffler et al. |
| 3,913,994 A | 10/1975 | Alling et al. |
| 3,975,066 A | 8/1976 | Hofmann et al. |
| 4,324,444 A | 4/1982 | Buczynski et al. |
| 4,342,490 A | 8/1982 | Swinley |
| 4,387,939 A | 6/1983 | Walter et al. |
| 4,397,507 A | 8/1983 | Kraus et al. |
| 4,463,994 A | 8/1984 | Eliason et al. |
| 4,558,961 A | 12/1985 | Fernlund |
| 4,630,872 A | 12/1986 | Teramachi |
| 4,684,268 A | 8/1987 | Sahlgren et al. |
| 4,732,496 A | 3/1988 | Shail |
| 4,865,473 A | 9/1989 | De Vito |
| 4,952,079 A | 8/1990 | Lingner |
| 4,978,237 A | 12/1990 | Motohashi et al. |
| 5,000,588 A | 3/1991 | Prinz |
| 5,051,006 A | 9/1991 | Van Voorthuijsen |
| 5,061,091 A | 10/1991 | Shiratori |
| 5,352,047 A | 10/1994 | Ingall et al. |
| 5,405,201 A | 4/1995 | Senger |
| 5,743,660 A | 4/1998 | Hillmann |

FOREIGN PATENT DOCUMENTS

| | | |
|---|---|---|
| CA | 925138 | 4/1973 |
| CA | 1014213 | 7/1977 |
| CA | 1038437 | 9/1978 |
| CA | 1067552 | 12/1979 |

*Primary Examiner*—Lenard A. Footland
(74) *Attorney, Agent, or Firm*—Christensen O'Connor Johnson Kindness PLLC

(57) ABSTRACT

A thrust bearing includes an annular first retainer, an annular second retainer and a plurality of rollers. The first retainer and second retainer are secured together to form a bearing cage. Each retainer has a circular outer sidewall, a concentric circular inner sidewall, and a web that extends between the outer sidewall and the inner sidewall. The web has a planar interior surface with a plurality of openings each adapted to accommodate a radiused portion of one of the rollers. The use of a web with a planar interior surface, without dividers, provides two advantages. The design leaves a maximum amount of room for rollers in the bearing which increases the bearing's capacity. The assembled cage allows for better lubricant flow to lubricate the bearing and wash potentially abrasive particles away from the rollers.

2 Claims, 4 Drawing Sheets

THRUST BEARING

CROSS-REFERENCE TO RELATED APPLICATION

This application is a continuation of prior U.S. application Ser. No. 09/741,773, filed Dec. 15, 2000, abandoned, priority from the filing date of which is hereby claimed under 35 U.S.C.§ 120.

FIELD OF THE INVENTION

The present invention relates to a thrust bearing and, in particular, a thrust bearing suitable for use in tools used for drilling oil and gas wells.

BACKGROUND OF THE INVENTION

The failure of tools used in oil and gas drilling, in the majority of cases, can be attributed to a failure of either seals or bearings. This patent application will address premature bearing failure.

There are two types of thrust bearings currently used is oil and gas drilling applications; thrust bearings having polymer plastic cages and thrust bearings having metallic cages. Polymer plastic bearings have a cage formed by two retainers joined together by means of rivets or adhesives to form a cage. The cage has solid dividers or cross bars that form radial pockets in which the rollers are positioned. The first retainer and second retainer have openings through which a radius portion of the rollers protrude. Polymeric cages are not preferred for high temperature applications as many of the materials can easily degrade at high temperatures. Also, on larger sizes the thickness of the plastic must be increased in order to make the cage sufficiently rigid.

Metallic cage bearings have a cage that is formed from a solid disc with radial slots that are open on the outer end. In between the radial slots are solid dividers. Rollers are retained in the radial slots by pressing a ring around the outside periphery of the disc. With this design, the solid dividers must be made sufficiently thick to ensure a reasonably rigid design.

The common items between both of the above designs are that they both include dividers between each roller pocket. These dividers provide a place for abrasive particles to become lodged and rub on the rolling elements of the bearing. This can have a detrimental effect on the life of said bearing.

The bearings are immersed in lubricant. The lubricant has a limited ability to "wash" abrasive grit out from between the rollers. Eventually, a build up of abrasive grit occurs and one or more of the rollers becomes jammed against the cage. The useful life of a thrust bearing, in the absence of overloading and other abusive situations, is currently around 80 hours. A drilling tool is, therefore, sent for servicing after 80 hours. Upon inspection after 80 hours, the bearings are usually in need of replacement.

SUMMARY OF THE INVENTION

What is required is a bearing that is capable of a longer useful life.

According to the present invention there is provided a thrust bearing which includes an annular first retainer, an annular second retainer and a plurality of rollers. The first retainer has a circular outer sidewall, a concentric circular second inner sidewall, and a first web that extends between the first outer sidewall and the first inner sidewall. The first web has a first planar interior surface with a plurality of first openings adapted to accommodate a radiused portion of one of the rollers. The second retainer has a circular second outer sidewall, a concentric circular second inner sidewall, and a second web that extends between the second outer sidewall and the second inner sidewall. The second web has a second planar interior surface with a plurality of second openings adapted to accommodate a radiused portion of one of the rollers. Each of the plurality of the second openings is paired with a corresponding one of the plurality of the first openings. The first retainer and the second retainer are secured together to form a cage. One of the rollers is positioned in each of the pairs of the first openings and the second openings, with a radiused portion of the roller protruding through the first web and the second web.

The life of an axial roller bearing is exponentially related to the life of said bearing. This relationship is generally understood to be an exponential relationship (to the power of 3.333). Therefore, even a modest increase in capacity can equate to large increases in bearing life. For example a 25% increase in bearing capacity will equate to over double the life of the bearing.

The key to obtaining maximum capacity in a thrust bearing lies in the number, length, and diameter of the rolling elements. Generally, as space in a cage is increasingly filled the rolling elements, the capacity increases. Therefore the cage design which allows for the most space to be occupied by the rolling elements will typically have the maximum capacity. The thrust bearing described above eliminates any dividers between the rollers and the design of the retainers allow for a rigid design that can use a minimum wall thickness.

The two retainers positively lock together to become a rigid cage. These factors enable a bearing to be designed for increased roller fill and maximum capacity. The invention increases the useful life of the drilling tool by extending the life of the thrust bearing. This is accomplished due to two inherent features of this invention. Firstly the two retainers with their locking mechanism form a sufficiently rigid cage with a minimum thickness occupied by said cage. Secondly the bearing does not have roller dividers as discussed above. This absence of dividers allows the lubricant to flush any abrasive particles out from between the rollers.

Although beneficial results may be obtained though the use of the thrust bearing, as described above, a further successful innovation lies in the manner in which the first and second retainers are secured together. Metallic two pieces cages are typically of assembled using an interference fit or have tabs which are to be bent into one or more of the roller pockets to retain two pieces together. Cages that use an interference fit do not provide a positive interlock of the two halves and may be prone to separation when exposed to adverse conditions such as heat and vibration. The bending or crimping process is comparatively more time consuming as a second process step is required to assemble a bearing cage. Polymer plastic bearing cages are currently secured together with adhesives or rivets. These procedures are also comparatively time consuming, and the use of adhesives does not provide a positive lock of the two halves. Also polymer plastics are not preferred materials for high temperature service.

Even more beneficial results were obtained by creating a snap fit locking engagement between the first retainer and the second retainer. According to this aspect of the invention the first outer sidewall and the first inner sidewall of the first retainer have a first engagement profile. Similarly, the second outer sidewall and the second inner sidewall of the second retainer have a second engagement profile. The first engagement profile and the second engagement profile engage to secure the first retainer and the second retainer. Assembly is extremely rapid, which enables the thrust bearing to be manufactured in a cost effective manner. While this description describes an interlock on the inner and outer sidewalls it can be imagined that a similar gain could be achieved using the described locking method on either the inner or outer sidewall or both.

The Prototype was withdrawn for inspection after 85 hours. Upon inspection it showed no wear. It is believed that this performance can be attributed to two factors. The first factor, is the cage design allows for the maximum amount of space to be filled by rollers thereby increasing the capacity and correspondingly increasing the life. The second is that the elimination of the dividers enabled lubricants to more effectively wash away abrasive particles which tend to adversely affect the life of a bearing.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
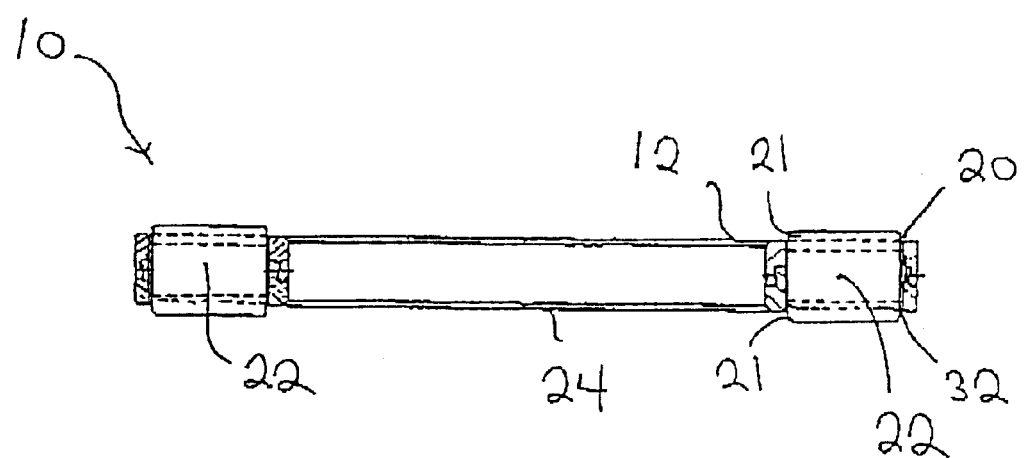
FIG. 1 is side elevation view, in section, of a thrust bearing constructed in accordance with the teachings of the present invention.

The preferred embodiment, a thrust bearing generally identified by reference numeral 10, will now be described with reference to FIGS. 1 through 4.

Figure 2:
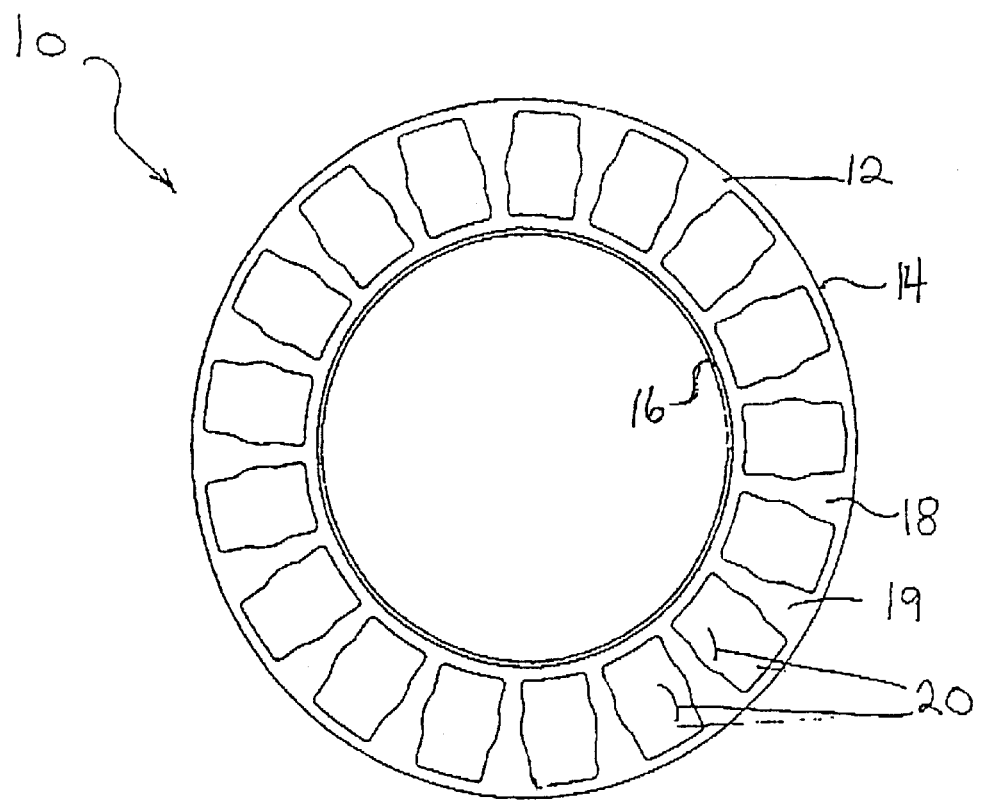
FIG. 2 is an exploded top plan view, in section, of the thrust bearing illustrated in FIG. 1.
Figure 2:
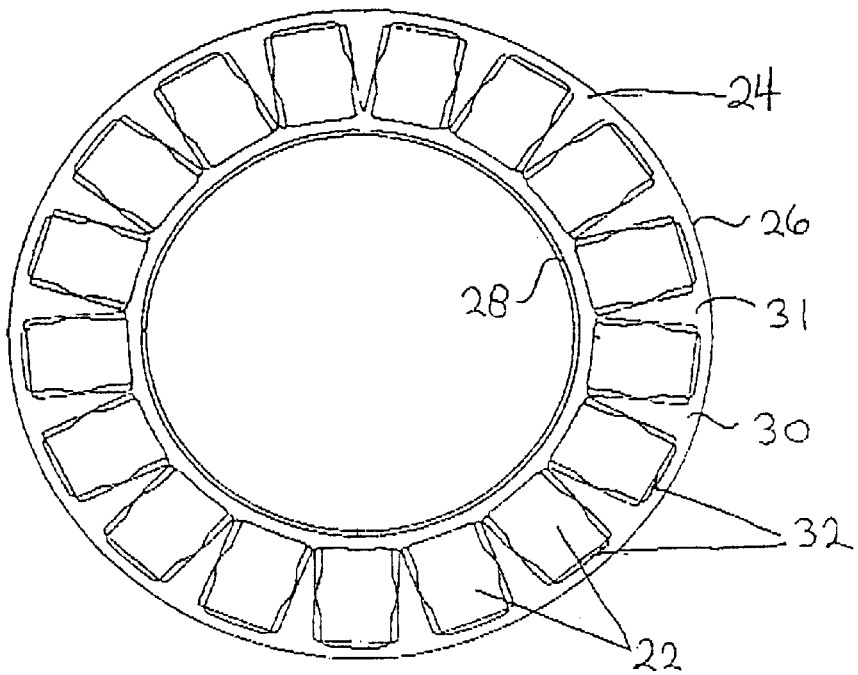

Referring to FIG. 2, there is a thrust bearing 10 that includes an annular first retainer 12 and an annular second retainer 24. First retainer 12 has a circular first outer sidewall 14 and a concentric circular first inner sidewall 16. There is a first web 18 that extends between first outer sidewall 14 and first inner sidewall 16. First web 18 has a planar interior surface 19 with a plurality of first openings 20. Referring to FIG. 1, each of first openings 20 is adapted to accommodate a radiused portion 21 of a roller 22. Referring to FIG. 2, annular second retainer 24 includes a circular second outer sidewall 26 and a concentric circular second inner sidewall 28. A second web 30 that extends between second outer sidewall 26 and second inner sidewall 28. Second web 30 has a second planar interior surface 31 with a plurality of second openings 32. Referring to FIG. 1, second opening are adapted to accommodate radiused portion 21 of a roller 22. Referring to FIGS. 1 and 2, each one of the plurality of second openings 32 is paired with a corresponding one of the plurality of first openings 20. Roller 22 is positioned in each of the pairs of first openings 20 and second openings 32 with a radiused 21 portion of roller 22 protruding through first web 20 and second web 30. Referring to FIG. 1, first retainer 12 and second retainer 24 secure together to form a cage 34.

Figure 3:
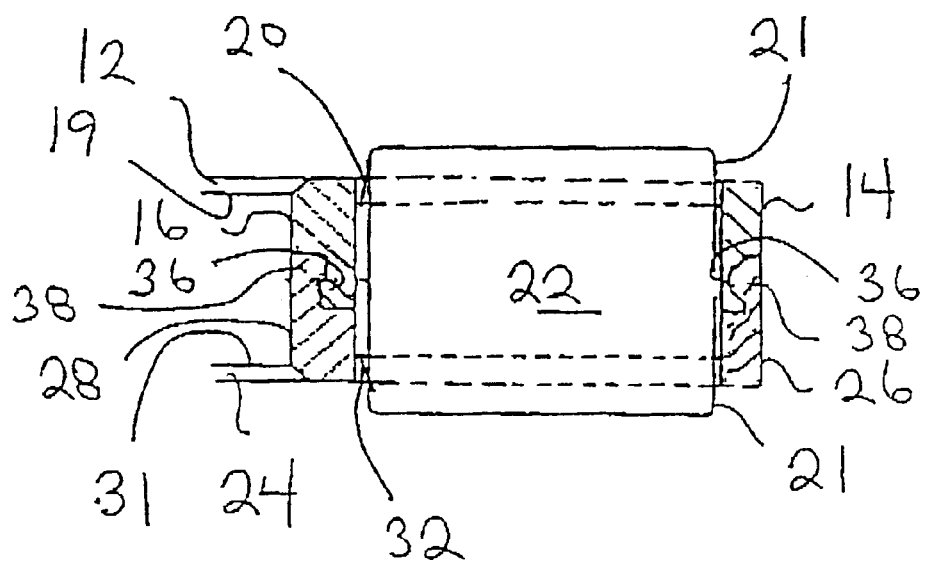
FIG. 3 is a detailed side elevation view, in section, of the thrust bearing illustrated in FIG. 1.

Another unique aspect of the thrust bearing 10 is the interlocking fit between first retainer 12 and second retainer 24. Referring to FIG. 3, first outer sidewall 14 and the first inner sidewall 16 of the first retainer 12 have a first engagement profile 36. Second outer sidewall 26 and second inner sidewall 28 of the second retainer 24 have a second engagement profile 38. First engagement profile 36 and second engagement profile 38 engage to secure first retainer 12 to second retainer 24. The interlocking retainers when assembled together provide a rigid cage with minimum sidewall thickness.

In the above described construction, all dividers are removed from between the first retainer 12 and the second retainer 24 to allow for increased space for more roller fill. This additional space when filled to optimum and maximum capacity serves to promote the flow of lubricant to more effectively wash abrasive particles away from the rolling elements 22. These two factors, in combination, result in dramatically increased bearing life.

Figure 4:
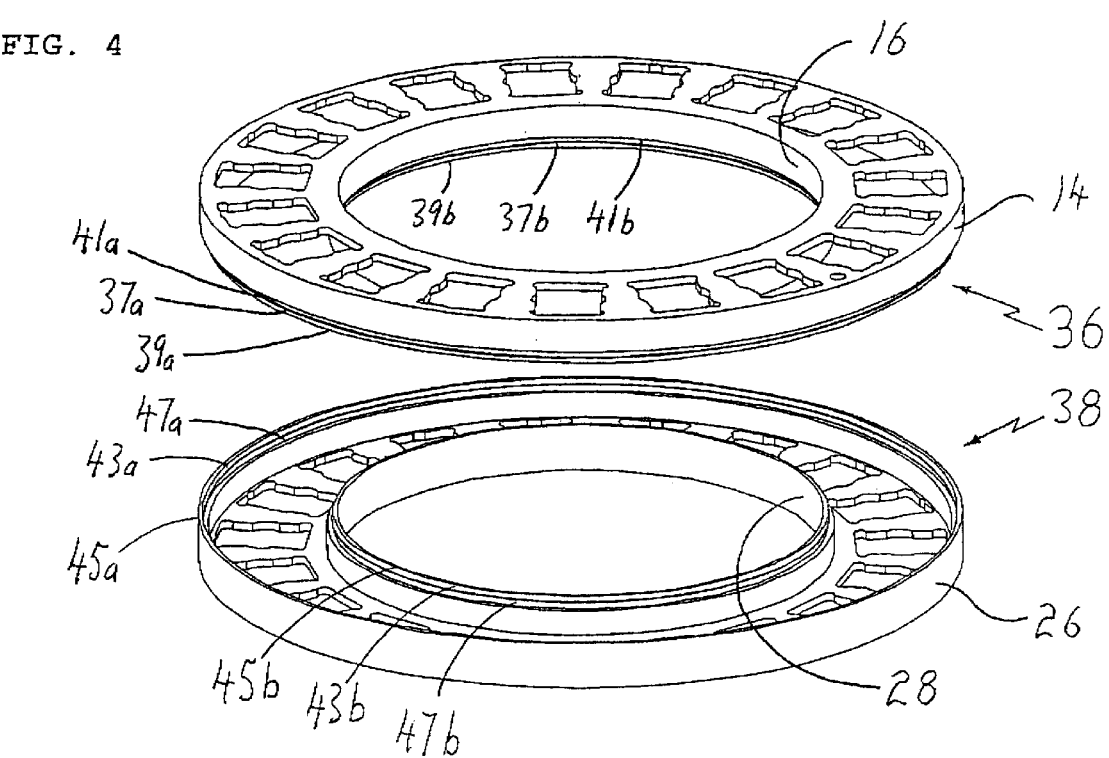
FIG. 4 is an exploded perspective view of the thrust bearing illustrated in FIG. 1.

Referring to FIG. 4, it can be seen that first interlocking engagement profile 36 is 360 degree, circumferential, and outwardly oriented. Similarly, second interlocking engagement profile is 360 degree, circumferential, and inwardly oriented. First interlocking engagement profile 36 on first outer side wall 14 consists of a 360 degree first tongue 37a along a first peripheral edge 39a with a 360 degree first groove 41a spaced from first peripheral edge 39a. Similarly, first interlocking engagement profile 36 on first inner side wall 16 consists of a 360 degree first tongue 37b along a first peripheral edge 39b with a 360 degree first groove 41b spaced from first peripheral edge 39b. Second interlocking engagement profile 38 on second outer sidewall 26 consists of a 360 degree second tongue 43a along a second peripheral edge 45a with a 360 degree second groove 47a spaced from second peripheral edge 45a. Similarly, second interlocking engagement profile 38 on second inner sidewall 28 consists of a 360 degree second tongue 43b along a second peripheral edge 45b with a 360 degree second groove 47b spaced from second peripheral edge 45b.

When first retainer 12 and second retainer 24 are snap fit together, first interlocking engagement profile on first outer sidewall 14 engages second interlocking engagement profile on second outer sidewall 26, with first tongue 37a engaging second groove 47a and first groove 41a receiving second tongue 43a. Similarly, first interlocking engagement profile on first inner sidewall 16 engages second interlocking engagement profile on second inner sidewall 28, with first tongue 37b engaging second groove 47b and first groove 41b receiving second tongue 43b.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A thrust bearing, comprising:
    an annular first retainer having a circular first outer sidewall extending without interruption for 360 degrees, a concentric circular first inner sidewall extending without interruption for 360 degrees, and a first web that extends between the first outer sidewall and the first inner sidewall, the first web having a first planar interior surface with a plurality of first openings adapted to accommodate a radiused portion of a roller;
    an annular second retainer having a circular second outer sidewall extending without interruption for 360 degrees, a concentric circular second inner sidewall extending without interruption for 360 degrees, and a second web that extends between the second outer sidewall and the second inner sidewall, the second web having a second planar interior surface with a plurality of second openings adapted to accommodate a radiused portion of a roller, each one of the plurality of second openings being paired with a corresponding one of the plurality of first openings, the first retainer and the second retainer being secured together to form a cage; and a roller positioned in each of the pairs of the first openings and the second openings, with a radiused portion of the roller protruding through the first web and the second web.

wherein the first outer sidewall and the first inner sidewall of the first retainer each have a 360 degree, circumferential, outwardly oriented, first interlocking engagement profile;

the second outer sidewall and the second inner sidewall of the second retainer each have a 360 degree, circumferential, inwardly oriented, second interlocking engagement profile; and the first interlocking engagement profile and the second interlocking engagement profile engage in a snap fit positive locking engagement to secure the first retainer to the second retainer.

2. The thrust bearing as defined in claim 1, wherein the first interlocking engagement profile is a 360 degree first tongue along a first peripheral edge with a 360 degree first groove spaced from the first peripheral edge, and the second interlocking engagement profile is a 360 degree second tongue along a second peripheral edge which engages the first groove with a 360 degree second groove spaced from the second peripheral edge which receives the first tongue.

* * * * *

UNITED STATES PATENT AND TRADEMARK OFFICE
CERTIFICATE OF CORRECTION

PATENT NO. : 6,883,970 B2
DATED : April 26, 2005
INVENTOR(S) : W. Horley

It is certified that error appears in the above-identified patent and that said Letters Patent is hereby corrected as shown below:

<u>Title page,</u>
Item [30], Foreign Application Priority Data, "2292286" should read -- 2292386 --.

Signed and Sealed this

Eleventh Day of October , 2005

JON W. DUDAS
*Director of the United States Patent and Trademark Office*